Figure 1:
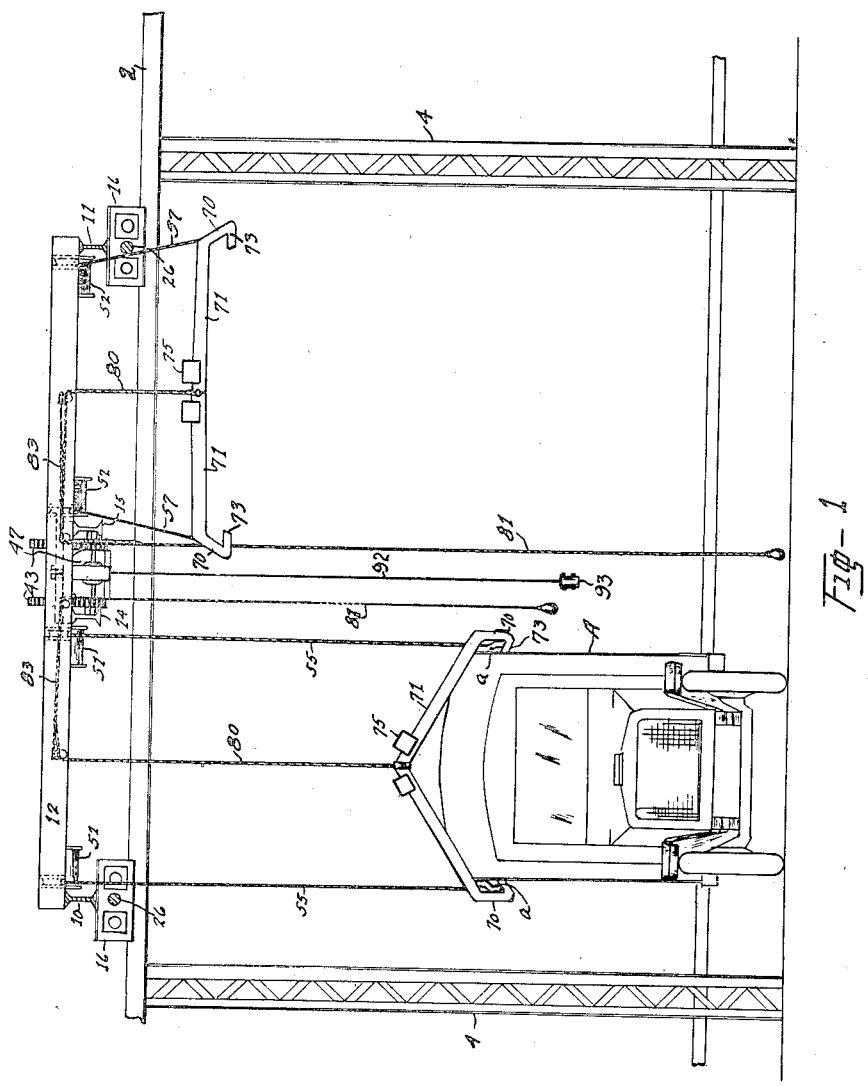

B. F. FITCH.
MECHANISM FOR HOISTING VEHICLE BODIES.
APPLICATION FILED MAR. 17, 1920.

1,433,993.

Patented Oct. 31, 1922.

7 SHEETS—SHEET 2.

Inventor
Benjamin F. Fitch
By Bates & Moehlin
Attorneys

B. F. FITCH.
MECHANISM FOR HOISTING VEHICLE BODIES.
APPLICATION FILED MAR. 17, 1920.

1,433,993.

Patented Oct. 31, 1922.
7 SHEETS—SHEET 3.

Inventor
Benjamin F. Fitch,
By Baker & Macklin,
Attorneys.

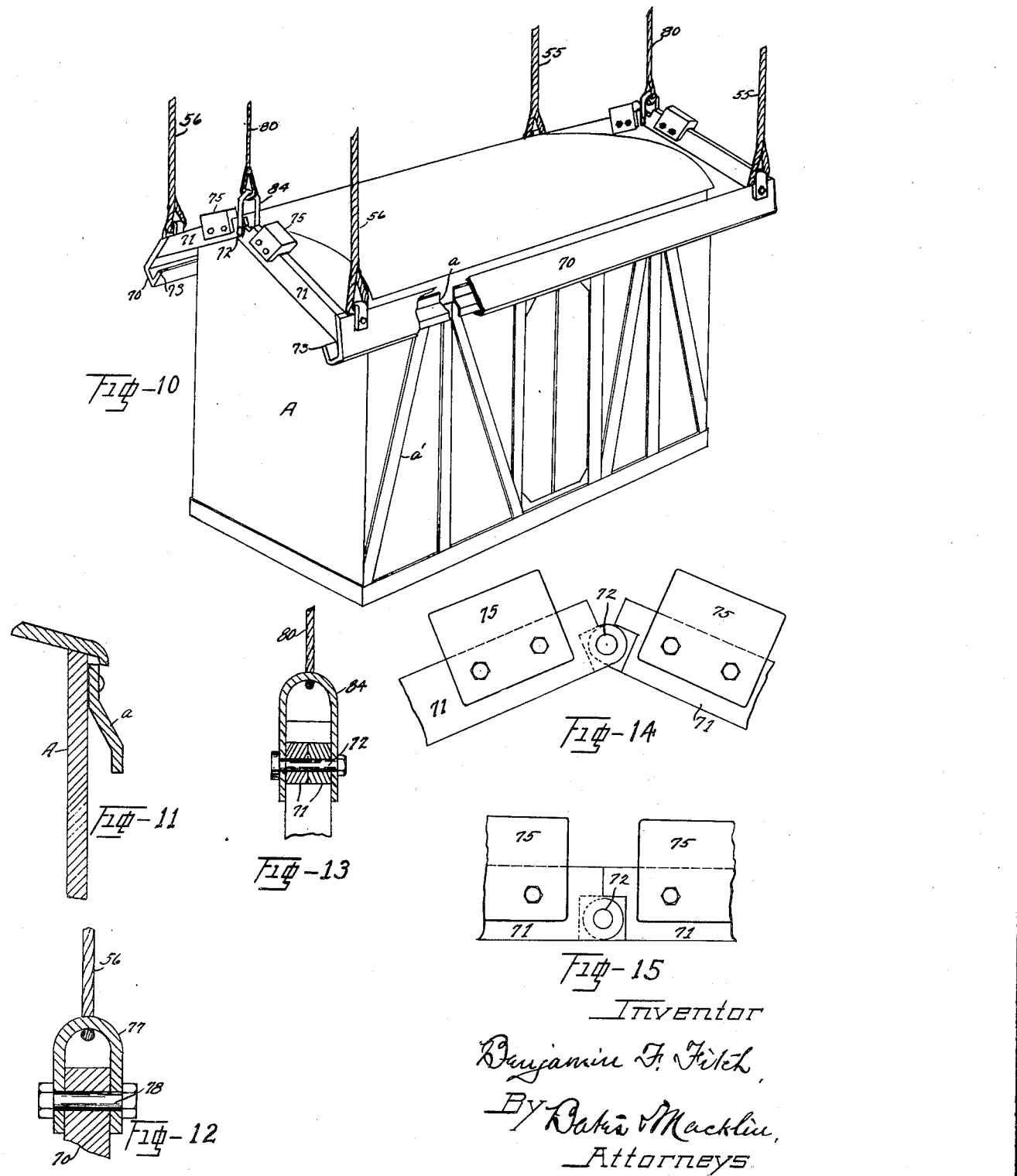

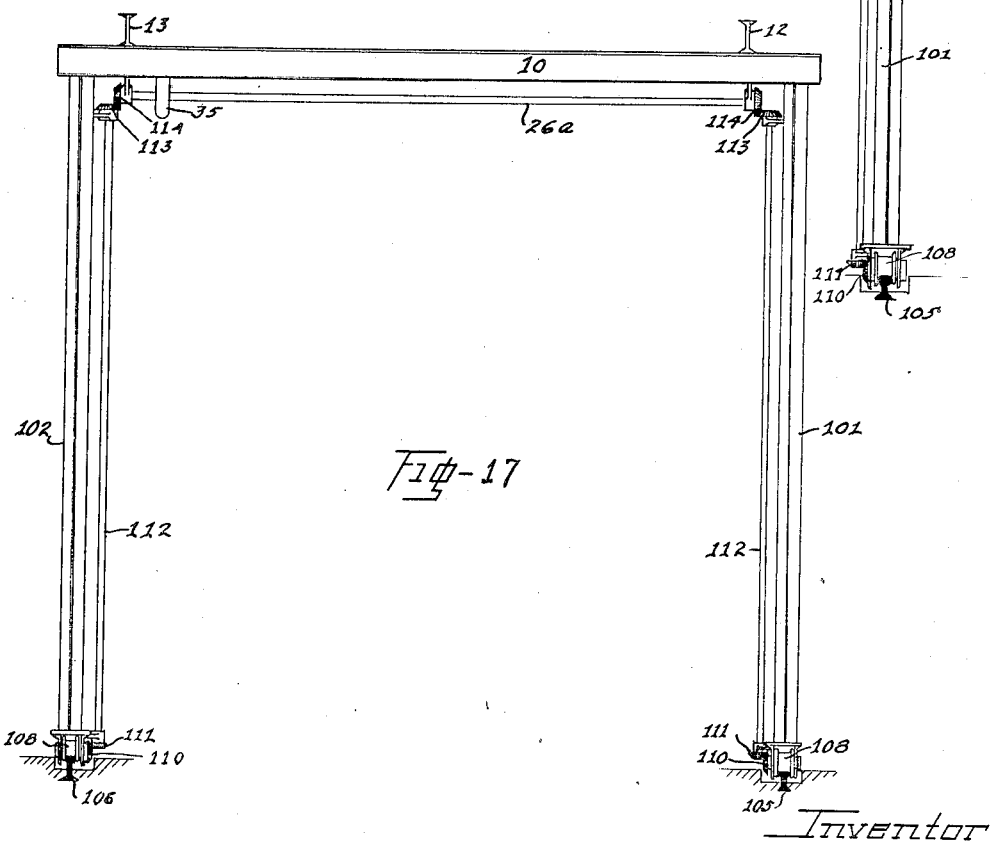

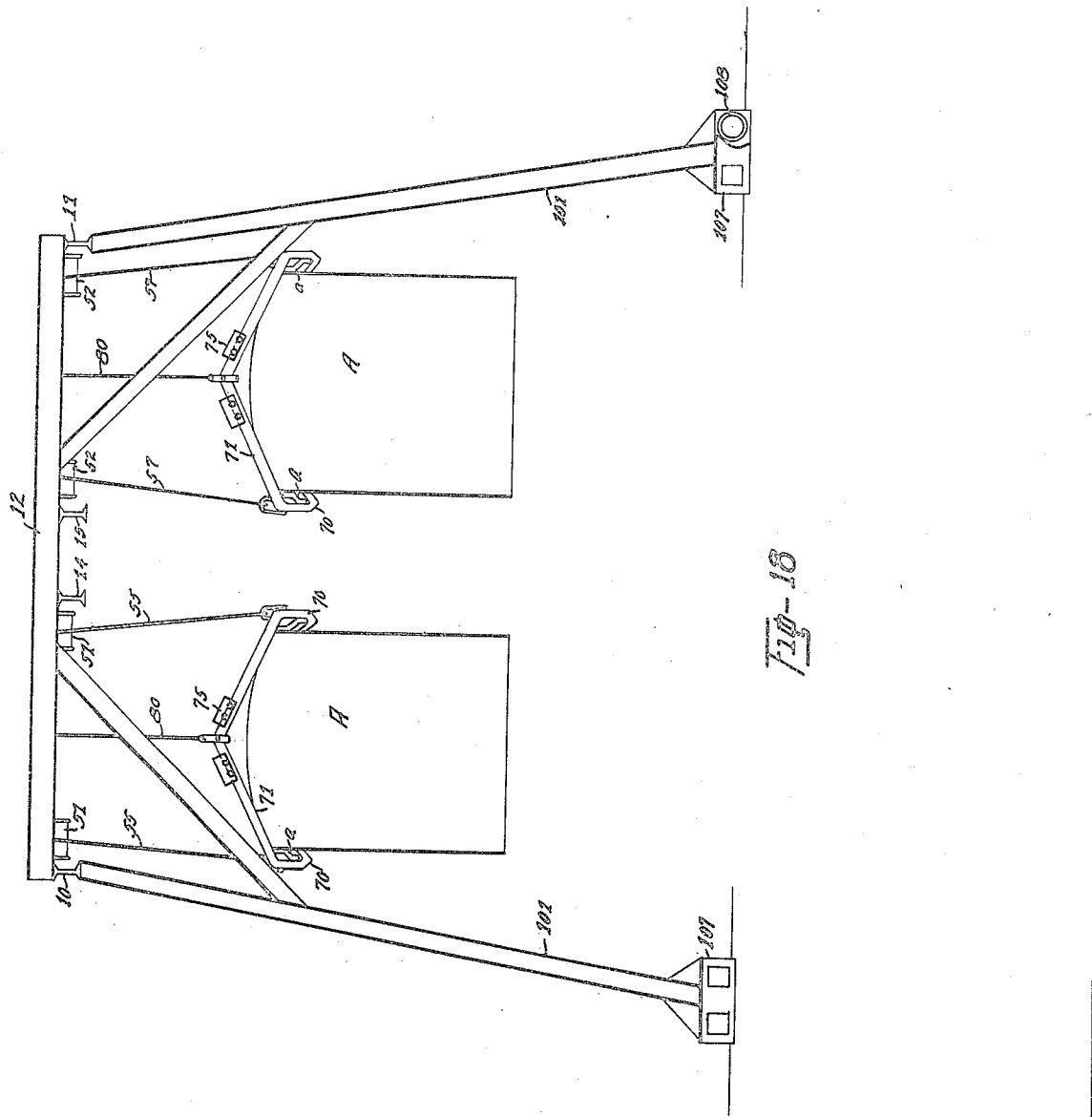

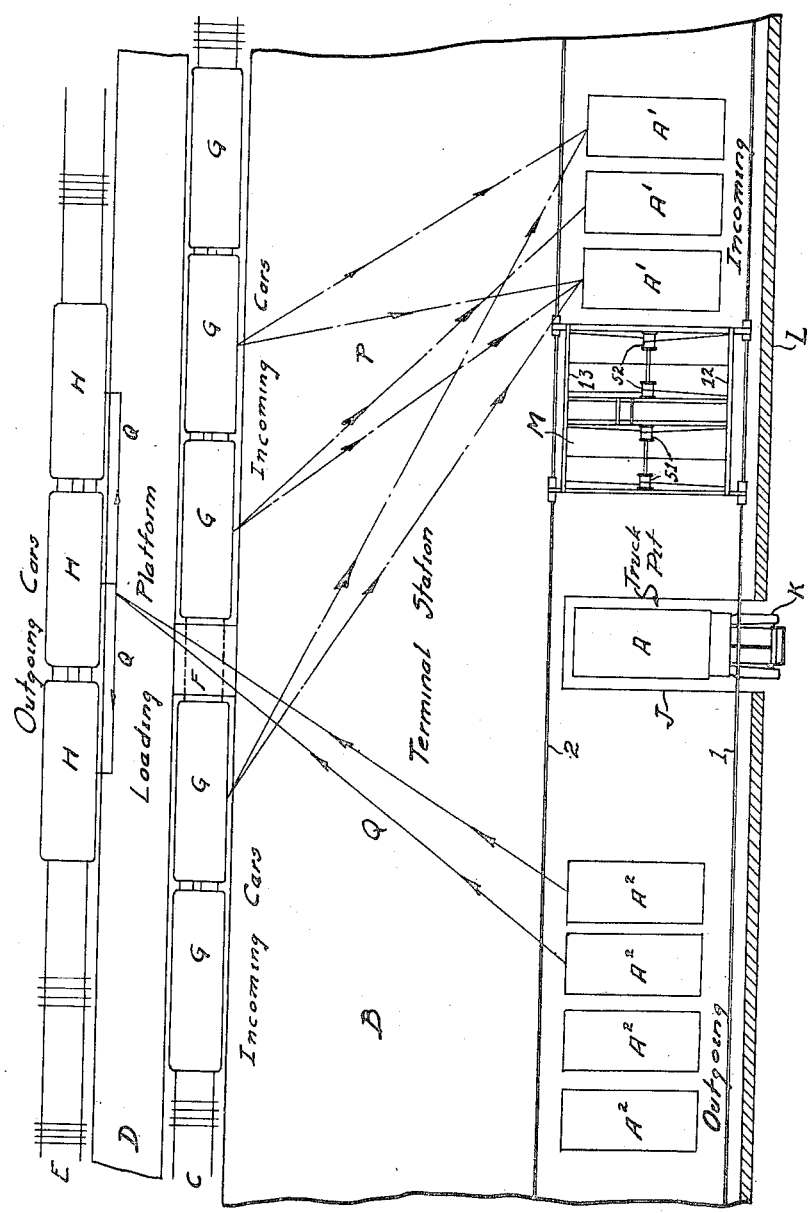

Patented Oct. 31, 1922.

1,433,993

UNITED STATES PATENT OFFICE.

BENJAMIN F. FITCH, OF EVANSTON, ILLINOIS.

MECHANISM FOR HOISTING VEHICLE BODIES.

Application filed March 17, 1920. Serial No. 366,543.

*To all whom it may concern:*

Be it known that BENJAMIN F. FITCH, residing at Evanston, in the county of Cook and State of Illinois, has invented a certain new and useful Improvement in Mechanism for Hoisting Vehicle Bodies, of which the following is a full, clear, and exact description, reference being had to the accompanying drawings.

This invention relates to hoisting and transporting mechanism adapted primarily for raising and moving the bodies of automobile trucks; it is especially useful in freight terminals where the freight is transported to or from the terminal by automobile trucks. My mechanism is adapted to lift and carry a removably body (loaded or unloaded) from an arriving truck and immediately to position another body on such truck, whereby the idle time of the truck at the station is reduced to a minimum, it being understood that there will be a number of removable bodies for each truck chassis and suitable floor space for depositing bodies arriving on the trucks so that the transfer may be made immediately.

In effecting the transfer in as short a space of time as possible I have provided the duplex hoisting and conveying mechanism hereinafter explained, which is so arranged that it may carry two bodies at a time and raise either and at the same time lower the other. As a loaded truck for instance, arrives at the station, it is possible for the mechanism to pick up a loaded body and move it into position adjacent to the truck, then to pick up the body from the truck and move with both bodies sufficiently to bring the body first mentioned over the truck frame, the operation of the mechanism then lowering this body onto the truck frame, which is then free to drive away with its new load, the mechanism thereafter depositing the received body in a suitable position for storage or unloading.

My mechanism is adapted for embodiment in a traveling crane or a gantry or a combination of the two. In its preferred form it provides on the traveling structure two load-supporting devices or cradles, each formed to engage a truck body and be suspended by four cables raised or lowered as a unit.

A further feature is the arrangement of the cradle in articulated form so that it may be lowered over the sides of the truck body and then by having the intermediate portions raised, may have its load-engaging portions move inwardly and engage rigid members secured to the body sides.

My invention includes the duplex mechanism broadly, the articulated cradles and their means of operation, and various other features which are illustrated in the drawings hereof and hereinafter described in detail. The essential novel features are summarized in the claims.

Reference is made to my copending application, Serial No. 463,531, filed April 22, 1921, for broad claims on the cradle mechanism shown.

Figures 2, 3, 4:
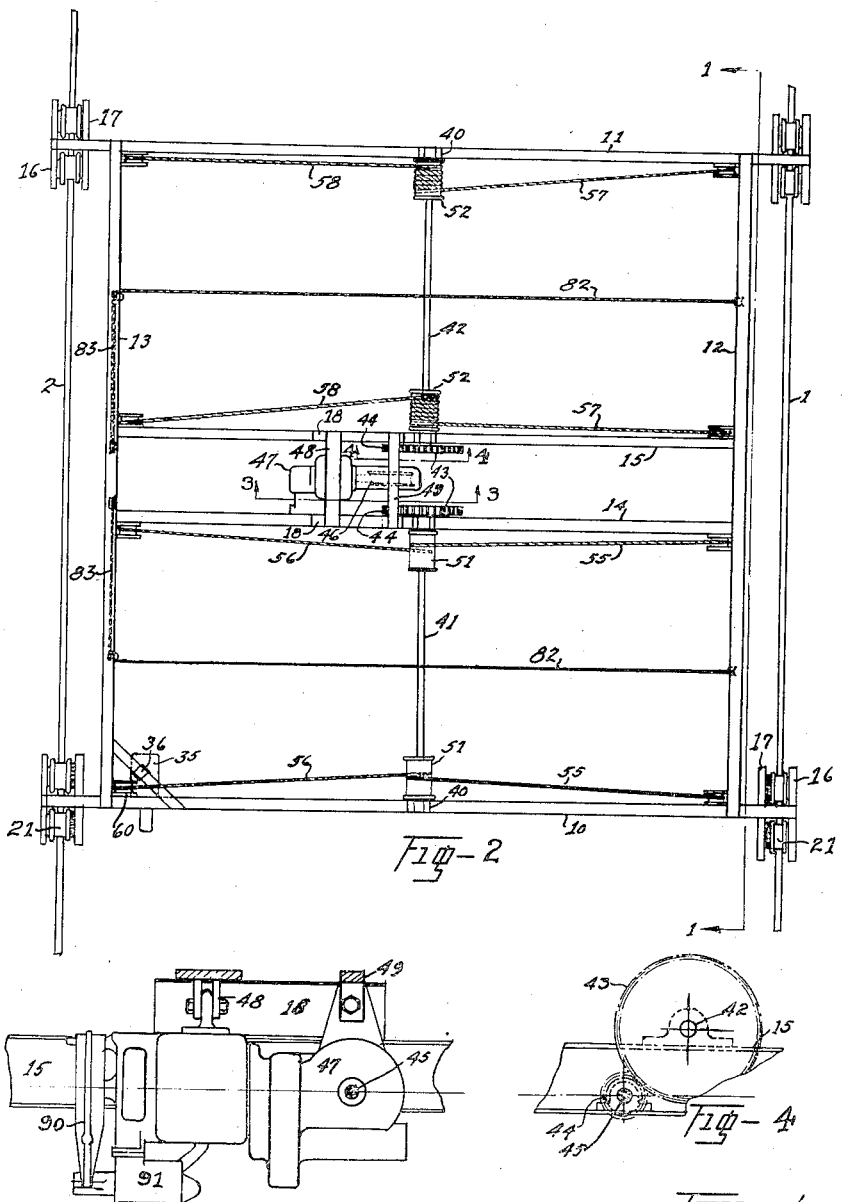
Figure 6:
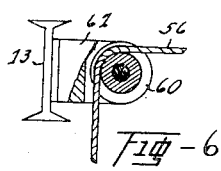
Figure 7:
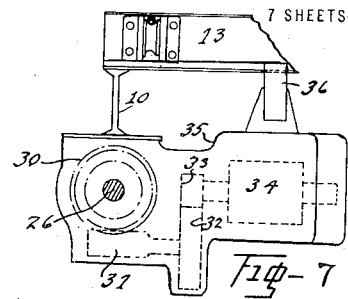
Figure 5:
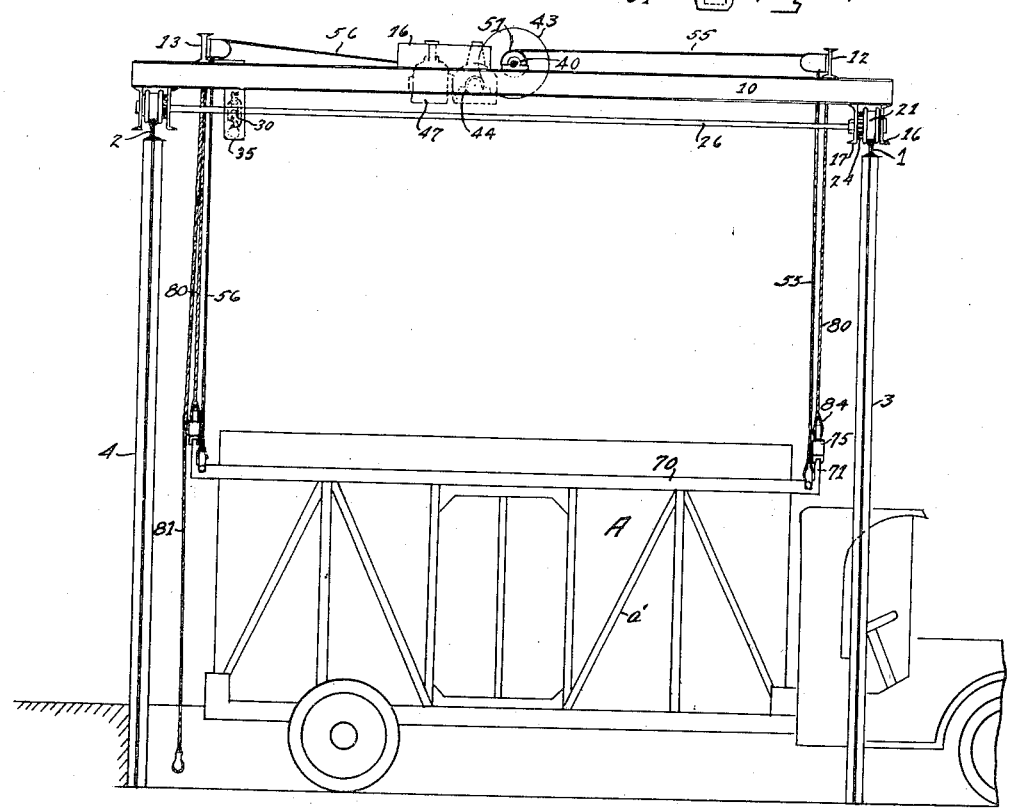
Figure 8:
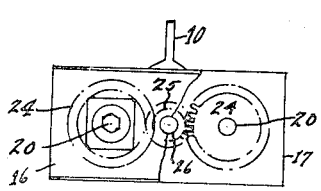
Figure 9:
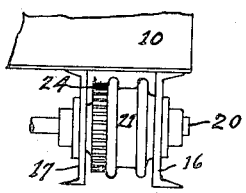

In the drawings, Fig. 1 is a side elevation illustrating my invention and showing the duplex hoisting mechanism embodied in a traveling crane supported on overhead trackways; Fig. 2 is a plan of the traveling crane mechanism shown in Fig. 1; Figs. 3 and 4 are details of the traveling crane mechanism, being in the nature of vertical sections on the correspondingly numbered lines in Fig. 2; Fig. 5 is an elevation of the hoisting and conveying mechanism at right angles to Fig. 1; Fig. 6 is a detail of one of the guiding pulleys over which a lifting cable passes; Fig. 7 is a detail of motor mechanism for moving the traveling crane; Figs. 8 and 9 are details of the driven wheel support of the traveling crane; Fig. 10 is a perspective of the articulated cradle in raising position on a truck body; Fig. 11 is a cross section through the body wall near the upper end; Fig. 12 is a detail illustrating the anchorage of the cable to the cradle; Fig. 13 is a detail illustrating the connection between the cradle and the buckling cable which acts on its joint; Figs. 14 and 15 are details of the hinged member which spreads the cradle or folds it; Fig. 16 is an end elevation of a one legged gantry to which my invention is applicable; Fig. 17 is a similar elevation of a two legged gantry which may be used; Fig. 18 is an elevation at right angles to Figs. 16 and 17 of the gantry shown in either of these figures. Fig. 19 is a plan of an illustrative terminal station equipment showing one means of effectively utilizing the hoisting and conveying mechanism.

Referring first to Figs. 1, 2 and 5, the numerals 1 and 2 indicate tracks suitably supported in elevated position, as for instance by the columns 3 and 4. The traveling crane equipped with the features of my invention is designed to ride on these tracks. As shown in these figures, the crane has an open body built up of structural members as for instance I-beams or channel beams. I have shown two transverse members 10 and 11 adapted to extend over the tracks, two longitudinal members 12 and 13 which rest on the members 10 and 11 and two intermediate transverse bracing members 14 and 15. These transverse members may have their ends secured beneath the longitudinal members 12 and 13, and may be spaced apart so as to provide bays through which the hoisting mechanism, which will be hereinafter described, extends.

The projecting portions of the transverse members 10 and 11 carry suitable wheels which support the crane and also furnish means by which it may be propelled; thus, as shown, each of these transverse members 10 or 11 has secured to its under side a pair of short channel beams 16 and 17 arranged with outwardly facing flanges as shown in Fig. 9. Journaled in these channel beams are studs 20 on which are the supporting wheels 21 which ride on the tracks 1 or 2. As shown, the wheels have flanges on each edge to engage the sides of the rail head.

Some or all of the supporting wheels 21 are power-driven to propel the crane longitudinally. To effect this I provide gears 24 on those wheels 21 which are to be driven, and I mesh with these gears 24 of the two adjacent wheels and intermediate pinion 25 on a transverse shaft 26. This shaft is shown as lying directly beneath the transverse frame member 10 and as operating the two pairs of wheels at that end of the crane. Suitable motor mechanism is provided for rotating the shaft 26. For instance, as illustrated in Figs. 5 and 7, there is a worm wheel 30 on the shaft meshing with a worm 31 which is connected by spur gearing 32 and 33 with the armature of a motor 34. All of this construction is housed in a suitable casing 35 secured to the under side of the transverse beam 10 and supported by a bracket or bar 36 connected to the longitudinal beam 13.

Mounted in bearings 40 carried by the various transverse beams 10, 11, 14 and 15 are a pair of aligned drum shafts 41 and 42. Each of these shafts is shown as provided at its inner end (between the beams 14 and 15) with a spur gear 43. Each of these spur gears meshes with a spur gear 44 on a lay shaft 45 which carries a worm wheel 46. This worm wheel is adapted to be driven by a worm, which through suitable bearing is connected with a motor. The gearing and motor are mounted in a suitable casing 47 (Figs. 2 and 3) which is suitably supported by cross members 48 and 49 connected to short beams 18, resting on the beams 14 and 15. The gearing between the worm wheel 46 and motor is not specifically shown but may be of the character described with reference to the propelling motor illustrated in Fig. 7.

On each of the shafts 41 and 42 are two drums and extending from each drum in opposite directions are cables. These drums and cables are arranged as follows, reference being had particularly to Fig. 2. Two cables 55 lead from the top of the drums 51 on the shaft 41 toward the right hand side of the crane; two cables 56 lead from the bottoms of these drums toward the left hand side; two cables 57 lead from the bottoms of the drums 52 on the shaft 42 toward the right hand side and two cables 58 lead from the tops of the drums 52 toward the left hand side.

The two drum shafts, being geared as described, must rotate in the same direction. If this direction is clockwise (looking at the rear end of the shaft 41 in Fig. 2) the cables 55 and 56 are simultaneously paid out and at the same time cables 57 and 58 are wound in. On the other hand if the shafts are rotated contra clockwise, the cables 55 and 56 are wound in and the cables 57 and 58 paid out. The motor it is to be understood, is reversible, to rotate these shafts in either direction as desired.

The various cables when they reach the side bars 12 or 13 pass downwardly over pulleys 60 which are mounted on stationary axes in suitable members 61 secured to the crane frame. The lower ends of the four cables 55 and 56 are connected with a cradle adapted to engage a movable truck body; similarly the lower ends of the four cables 57 and 58 are connected with another cradle for this purpose. These two cradles move up or down alternately, either rising as the other falls, the purpose of which will be more apparent after the cradles and their operation has been described.

Referring to Figs. 1, 5 and 10 each cradle comprises a pair of longitudinal hooked bars 70 and two pairs of transverse bars 71 rigidly secured at their outer ends to the bars 70 and hinged together at their inner ends by hinge pin 72. The various bars therefore, make an open articulated frame. When the bars 71 are substantially horizontal, as shown in the right hand portion of Fig. 1, the cradle is spread sufficiently so that the longitudinal bars 70 may be passed freely beyond the sides of a truck body, these longitudinal bars being of sufficient length so that the cross bars will lie beyond the ends of the body. If however, the hinge of the cross bars 71 is drawn upwardly to fold the cradle, as shown in the left hand half of Fig. 1 the longitudinal bars 70 are drawn inwardly so that their hooked edges 73 may engage beneath suitable projections on the sides of the truck body and thereafter raise such body.

In various views, "A" indicates a removable truck body. This is shown as provided near the upper edge of each side wall with a suitable downwardly extending hooked member adapted to be engaged by the hooks 73. The body hooks may be in the form of rolled structural members "a" extending the length of the body, or there may be short members on the sides of the body, according to the construction of the body frame. The body frame preferably has a suitable side trussing as indicated at "a'" Fig. 5, so that the stresses of the load on the body floor may be suitably carried to the upper edge of the wall where the projecting members "a" are located.

It will thus be seen that the body is provided near its eaves with downwardly projecting rigid hook-members while the cradles provide upwardly projecting hook-members adapted to interlock therewith. The spreading bars 71 are preferably provided with one or more weights to give them a tendency to drop intermediately and spread the cradle. These weights are illustrated at 75 surmounting the bars near the hinge pintle and bolted to the bars. The elevating cables, as 55 and 56 for example, are secured to the cradle bars 70 by suitable means; Fig. 12 shows them as anchored by means of clevices 77 held to the cradle bars by bolts 78.

To buckle the hinge 72 and draw the cradle bars inwardly to engage the truck body I provide cables 80 which are connected by clevices 84 with the hinge pintle 72. These cables 80 pass upwardly to the hoist frame where they are connected with suitable manual means for operating them. Any suitable means may be employed for this purpose. For instance, as shown, the cable 80 from what may be called the front side of the mechanism (that shown in Fig. 1) may pass upwardly to the hoist frame and over a pulley and thus as at 82 Fig. 2 across the frame and around another pulley and then longitudinally as at 83, along the beam 13 and then downwardly within reach of the operator as shown at 81. The corresponding cable 80, directly at the rear of those appearing in Fig. 1, may pass upwardly across a sheave and thence along the frame at 83 with the cable first described, the two joining at some suitable point. This means a pull on cable reach 81 will draw up both of the cables 80 connected with two pairs of end bars of the corresponding cradle and draw it into position for engaging the body hook-members.

The weighted spreading arms 71 tend to keep the cradle spread, as shown in the righthand portion of Fig. 1. To cause such cradle to engage a body beneath it, the motor is operated to lower the cables 57 and 58 until the cradle bars stand on opposite sides of the body below the side hook-members "a" thereon. Then the cradle is buckled by drawing up on its hinge (readily accomplished manually by pulling down on the cable reach 81) and this swings the troughs 70 inwardly beneath the hook-members "a". Then, when the motor is operated in the reverse direction to draw up on the cables 57 and 58 the cradle bars engage the body hooks and the whole body is raised.

The hoisting and conveying mechanism has been described as embodying a traveling crane adapted to travel on stationary overhead tracks. It may, however, be equally well embodied in a gantry or a combined gantry and crane. Fig. 17 illustrates the gantry. In this view, the crane mechanism heretofore described constitutes the rigid top of the gantry. All of the mechanism is constructed as heretofore described with the exception of the trolley features. Instead of direct supporting wheels, this gantry is provided with suitable legs which carry the wheels at their lower ends. Thus there are two legs 101 at the front and two legs 102 at the rear. Each leg carries at its lower end supporting wheels adapted to track on stationary tracks 105 and 106. The arrangement of the wheels may be similar to that described for the crane and illustrated in Figs. 8 and 9; that is to say, at the foot of each leg is a pair of channel members 107 between which are a pair of wheels 108. These wheels have gears intermediately meshing with a driving pinion which is on a short shaft carrying at its inner end a bevel gear 110. These bevel gears mesh with bevel gears 111 on the lower ends of upwardly extending shafts 112 carried by the legs. At the upper ends of these shafts are bevel gears 113 which mesh with bevel gears 114 on a shaft 26$^A$ corresponding to the shaft 26 of the crane. The rotation of this shaft 26$^A$ by suitable motor mechanism (the casing of which is illustrated at 35) will rotate the supporting wheels 108 and thereby propel the gantry.

Fig. 16 illustrates a combined traveling crane and gantry wherein the lefthand or rear portion is similar to that described for the traveling crane and the righthand or leg portion is similar to that described for the gantry. The propelling shaft 26$^b$ in this case will directly connect at the left end with a pinion meshing with gears on the supporting wheels 21, as described with reference to the crane, and on the other end by bevel gearing and an upright shaft with the supporting wheels 108, as described with reference to the gantry. The corresponding reference numerals on Fig. 16 will make the correspondence of the construction clear without further description, Fig. 18 being considered a front view of either the embodiment of Figure 16 or that of Figure 17.

It will be seen that the overhead hoisting mechanism is the same whether the crane, the gantry or the combination be employed. In any case, the whole duplex hoisting mechanism travels as a unit, and the construction of the hoisting mechanism is such that when either cradle is raised the other is automatically lowered. This latter feature results from the cables for the drums 52 passing on and off the drum at points which are diametrically opposite to the points where the corresponding cables engage the drums 51, the forward cables 57 will lead from the bottoms of their drums.

The provision for raising and lowering the two supported bodies simultaneously, one going up while the other is going down, introduces a great saving of time in the operations for which the mechanism is primarily intended. Thus when the hoist is used for replacing the removable body on a truck by another removable body, the latter body may be first engaged and elevated and moved laterally (over the top of other bodies if any intervene) to any extent necessary to carry the lowered cradle over the body to be removed. Then a slight additional lowering will be all that is necessary to bring this latter cradle into position to engage the body on the truck. Then, after the cradle has been buckled, a reversal of the raising operation raises this body from the truck and lowers the other one, and if at the same time the crane mechanism is shifted laterally the body to be positioned on the truck frame may be directly over it by the time it is lowered almost to the frame. A slight additional lowering places this body on the truck frame. This leaves the other body in elevated position convenient for immediate transportation laterally over the tops of other bodies which may be standing on the platform.

The duplex hoisting operation combined with the lateral shifting of whole raising mechanism thus enables a body to be removed from a truck frame and another immediately substituted, so that no time is lost by the truck. The trucks may thus spend nearly their whole time in transporting their loads between stations, and accordingly the number of trucks required to accomplish a given transportation operation is correspondingly reduced.

The motor driving mechanism employed is of the self-locking type, so that the loads will remain in any position to which they may be brought by the elevating motor. This self-locking result may be accomplished, as is well understood, by making the worm of very gradual pitch, or a more efficient device may be arranged by not relying on the worm itself to perform the locking, but by providing an automatic electric brake for that purpose. Several of such brake mechanisms are on the market associated with hoisting motors; the casing for one is illustrated at 90 in Fig. 3. 91 in this figure indicates a controller for the motor and brake: From this controller a cable of wires 92, leads to a push button switch 93, within easy access of the operator.

It should be noted further that with my duplex hoisting mechanism each cradle counter-balances the other, and a body supported by one cradle to a greater or lesser extent counter-balances the body supported by the other, depending of course, on the relative weight of their loads. When the hoist comes into place to remove a loaded body, its other cradle will ordinarily be carrying a loaded body which accordingly will to a great extent, if not entirely, counter-balance the body to be raised from the frame and thus the raising of the latter body and the lowering of the former will be accomplished with a comparatively small expenditure of power.

The body just removed will remain elevated during the transportation laterally to a standing position and its lowering may then of course be accomplished without using much power. Accordingly, in the combined operation of raising one body, transporting it laterally, raising another body from the hoist and depositing the first body on the truck frame and transporting laterally and lowering the removed body, the only operation requiring much power is the raising of the first body, since the other operations are either counter-balanced or consist of lowering.

It is to be understood that the choice of the crane, the gantry, or the combined structure is dependent not only upon the particular use to which the invention is to be put, but frequently on the existing station or freight terminal facilities with which the equipment must be harmonized. One of the valuable features of the invention is its adaptation to various existing equipments. I have illustrated in Figure 19 one form of station equipment with which my hoisting and transporting mechanism may cooperate with great efficiency, the equipment there shown representing a railway freight station. A somewhat different form of equipment would preferably be employed where the station is located off the railroad, being what may be called an inland terminal, and a still different form where the terminal is a warehouse. It must be understood therefore, that the equipment illustrated in Figure 19 is simply by way of example of many different forms of equipment.

In Figure 19, B indicates a station platform, C a railroad track adjacent to one edge of the platform, D a narrow loading platform beyond the track C, and E a track beyond the loading platform. The two platforms are on a hand-trucking level with the car floors and in use may be connected by a removable bridge floor F extending across the track C. G indicates a string of incoming cars to be unloaded and H a string of outgoing cars to be loaded. J indicates a pit made in the platform on the opposite side from the railroad tracks and of sufficient size so that a truck may back into it. Such truck is indicated at K and carries the removable body A. Other removable bodies A¹ and A² are shown standing on the platform, either side of the pit. L represents the outer wall or front of the building, the space in front of that may be a city street.

In Figure 19, I have shown at 1 and 2 rails for carrying my duplex hoist. The hoist itself is shown at the right of the pit and is indicated by M. The space at the right of the pit is shown as apportioned to incoming freight and at the left outgoing freight. The removable bodies A¹ at the incoming region are adapted to be loaded by trucking (either with hand or industrial trucks) across the platform B from various cars G, as indicated by the arrows on the broken lines P. The freight from the removable bodies A², located in the outgoing region of the platform, is transferred by trucks, the path of which is indicated by the full lines Q, across the platform B and onto the loading platform and into the various cars H.

In the operation of the equipment illustrated in Figure 19 we will suppose that when the station opens for business in the morning there is on the track C a string of cars loaded with L. C. L. freight for distribution either to other freight stations or to warehouses or directed to consignees. On the track E is located a string of empty cars to receive L. C. L. freight. Located at the incoming region of the platform are empty bodies A¹ and at the outgoing region loaded bodies A², left from the day before.

Now the various attendants convey the freight by hand or power trucks from the various cars G across the platform and store it into different bodies A¹ according to its destination, each body having a single destination. At the same time other attendants are taking freight from the bodies A² and trucking it to the empty cars H and loading it therein. The same operation is going on at other stations of the system, and at the same time trucks are being operated transferring loaded bodies between stations. In Figure 19 we are assuming that a truck has just arrived with a loaded body A thereon. While this truck is coming into position in the pit J, the operator of the duplex hoist M shifts it laterally over one of the bodies A¹ which by this time has been loaded. He engages this body with the righthand cradle and raises it higher than the tops of the other bodies A¹ and shifts the mechanism laterally to bring the empty cradle over the pit J. Then as soon as the truck is in place he causes this cradle to engage the body on the truck and immediately raises this body, the body A¹ at the same time descending and acting as a counter-weight for the raised body. After the body on the truck has cleared it, the hoist travels laterally to bring the body A¹ over the truck, this lateral movement preferably taking place while the raising and lowering of the bodies is going on. About the time the body A¹ comes over the truck frame, this body has been lowered so that a small further movement deposits it on the truck. Then the cradle is caused to clear the body and the truck drives away. At the same time the crane moves to the right and deposits the body just received from the truck in the outgoing region of the platform, the travel of the crane carrying the body to some vacant space on the platform, the body if necessary traveling over the tops of bodies standing on the platform. As soon as this new body is put in place its doors may be opened and the unloading of it begun.

After the loaded truck has left the station, it drives immediately to its destination and the same or a similar operation takes place with reference to its load at that station. There are preferably a sufficient number of trucks traveling between the different stations so that a new loaded truck will arrive at a station about as soon as a body has been loaded for transfer.

It will be seen that by means of my duplex hoists and suitable station equipments, the received L. C. L. freight may be unloaded and distributed and transferred to other stations, then unloaded and re-distributed, continuously and with great expedition. By providing a sufficient number of removable bodies, the unloading from the cars and the reloading to them may go on with great rapidity, while a smaller number of trucks operated continuously between the stations may serve to transfer these bodies, my hoisting and transporting mechanism enabling the removal of the body from the truck and the placing of the new body thereon in a minimum of time.

I claim:

1. The combination with a set of overhead tracks, of a platform beneath the tracks for supporting removable automobile bodies, a frame traveling on said tracks, said frame having two bays, drum shafts extending longitudinally of the tracks and positioned at the middle of the frame, cables extending from said drum shafts, cradles carried by the cables, said cradles being substantially the form of a body, cable operating mechanism intermediate the drum shafts, and means independent of said cradles for causing them to engage a load.

2. In combination, a platform, a set of overhead tracks extending longitudinally of the platform, a frame traveling on said tracks, two foldable cradles mounted on the frame, means mounted on the frame for raising and lowering said cradles, said means being so arranged that one cradle is raised when the other cradle is lowered, and means for folding the cradles for permitting them to engage a body.

3. In combination, a platform having removable automobile bodies thereon, a truck runway extending across the platform, a frame traveling overhead and longitudinally of the platform, a duplex hoisting mechanism carried by the frame, said mechanism comprising two collapsible cradles that are adapted to fit over a removable body, and means independent of the hoisting mechanism for collapsing said cradles to cause the sides thereof to engage a body.

4. In combination, a platform, overhead tracks extending longitudinally of the platform, removable bodies positioned on the platform, a duplex hoisting mechanism traveling on said tracks, a truck runway adjacent the platform, and means depending from the hoisting mechanism for engaging a body.

5. In combination, a narrow platform having removable automobile bodies thereon, tracks extending overhead and lengthwise of the platform, a duplex hoisting mechanism traveling on said tracks, cradles extending from the hoisting mechanism, each of said cradles comprising an open rectangular frame hinged at the ends thereof, and means connected with the hinges for connecting a cradle and for causing the cradle to engage the sides of a removable body.

6. In combination, a platform having removable automobile bodies, each of said bodies having trough-shaped members extending along the sides thereof, a duplex hoisting mechanism adapted to travel along the platform, said mechanism comprising two collapsible cradles that are so arranged that one may be raised when the other is lowered, each of said cradles having means for engaging the trough-shaped members on the automobile body, and means whereby the hoisting mechanism may transport two bodies over other bodies positioned on the platform.

7. The combination of a frame, a motor thereon, four drums on said frame geared with said motor, two pairs of cables leading respectively from the upper and under sides of two of said drums, and two pairs of cables leading respectively from the under and upper sides of the other pair of drums, the eight cables being adapted to support two loads in such manner that when one is raised the other is lowered, and a collapsible load engaging device depending from the supporting cables.

8. The combination of a traveling frame, two aligned shafts therein, a motor geared with both shafts, two pairs of drums on said shafts and four pairs of cables leading from the upper and under sides of the drums respectively, and a load engaging cradle hinged at both ends and connected with said cables.

9. The combination with a platform carrying removable automobile bodies of a frame, a motor carried thereby, four drums adapted to be rotated in the same direction by said motor, eight cables passing off of said drums in such direction that for a single direction of the rotation of the drums four cables are wound in and four are paid out, and two load engaging devices, one carried by said wound in cables and the other by said paid out cables, each of said devices comprising a collapsible frame that is adapted to extend around a body and to be buckled inwardly to engage the sides of said body.

10. The combination of a traveling frame, four winding drums carried thereon, a motor for rotating all of said drums in the same direction, cables passing in opposite directions from each drum, four of said cables passing from the upper sides of the drums and four from the lower sides, whereby, when the motor is operated in one direction, four cables are wound in and four are paid out, and means comprising interengaging trough-shaped members whereby the four wound-in cables may engage one removable body of a truck and the four paid-out cables may engage another body.

11. The combination of a frame, supporting wheels therefor, a motor carried by the frame, four drums adapted to be rotated in the same direction by said motor, eight cables passing off of said drums in such direction that for a single direction of the rotation of the drums four cables are wound in and four are paid out, two collapsible devices each adapted to engage a removable truck body, one of said devices being carried by said wound-in cables and the other by said paid-out cables, and means extending over the top of the frame for collapsing said devices.

12. The combination with a pair of separated overhead tracks of an overhead frame and means whereby it may travel between said tracks, a motor for propelling the frame, duplex winding mechanism carried by the frame, a single motor directly connected with said mechanism for operating it, cables depending from the duplex winding mechanism, and two open frames carried by said cables for engaging two removable bodies of automobile trucks, each of said frames comprising a member hinged at the middle and arranged to be buckled inwardly by means other than the raising cables.

13. The combination with a frame, of two sets of winding mechanisms thereon, two sets of cables depending therefrom, one set being raised when the other set is lowered, a cradle carried by each set, each cradle comprising a pair of hooked side bars adapted to engage a load, spreading bars connected with the side bars and hinged together, and adjustable means on the spreading bars for constantly urging the middle portion thereof downwardly.

14. The combination of a frame, two sets of winding mechanism thereon, two sets of cables depending therefrom, one set being raised when the other set is lowered, a cradle carried by each set, each cradle comprising a pair of side bars adapted to engage a load and spreading bars connected with the side bars and hinged together, and a cable connected with the hinges of the respective spreading bars and adapted to draw them upwardly to buckle the cradles, said cable being operable independently of the winding mechanism.

15. The combination of a traveling frame, mechanism for propelling it, winding mechanism on the frame, four cables depending from the winding mechanism, a cradle carried by the four cables and comprising a pair of side bars and end bars connected to the side bars and hinged to each other, and a cable connected with the end bars adjacent to the hinge.

16. The combination, with an automobile truck having a removable body, of a platform adapted to support other removable bodies, and a duplex hoisting and conveying mechanism adapted to raise one of the platform-supported bodies and transport it laterally over other bodies on the platform, said mechanism having means to engage the removable body on the truck while said other body is supported by the mechanism, whereby the body on the truck may quickly be replaced by another body.

17. The combination, with means for supporting a set of removable automobile bodies and a space in which a truck may stand, of a duplex traveling hoist adapted to engage a removable body and transport it laterally and while the same is suspended to engage and remove the body on the trucks, whereby the truck body may be replaced by the suspended body.

18. The combination, with a station platform adapted to support removable bodies, of a traveling duplex hoist mechanism adapted to engage and suspend two bodies side by side and longitudinally of the station platform and means whereby said hoisting mechanism may raise one body and at the same time lower the other.

19. A combination with a station platform adapted to support removable bodies, of a traveling duplex hoist mechanism adapted to engage and suspend two bodies side by side, means whereby said hoist mechanism may raise one body and at the same time lower the other, there being provision for standing an automobile truck with a removable body beneath the path of the hoist mechanism, whereby the hoist mechanism may raise the body from the truck while it is suspending another body, the latter body being deposited on the truck while the body being removed from it is suspended.

20. A combination of a station platform, a set of removable truck bodies adapted to stand thereon, an automobile truck, and a traveling duplex hoist mechanism adapted to engage and suspend two bodies side by side and raise one body and at the same time lower the other, there being provision for standing the automobile truck with a removable body thereon beneath the path of the hoist mechanism, whereby the hoist mechanism may raise a body from the platform and while it is suspending the same raise the body from the truck, the body from the platform being deposited on the truck while the body from the truck is suspended.

21. The combination with a removable automobile body having downwardly extending hook members at its side, adjacent to the top, and a suspended raising cradle consisting of longitudinal bars and end bars connected to the longitudinal bars and hinged to each other, the longitudinal bars being longer than the body and the end bars being a greater distance apart than the length of the body, whereby the cradle may be dropped freely over the body, the buckling of the hinge thereafter bringing the longitudinal bars beneath the body-member hooks.

In testimony whereof, I hereunto affix my signature.

BENJAMIN F. FITCH.